(No Model.) 6 Sheets—Sheet 1.

H. HOLLERITH.
ART OF COMPILING STATISTICS.

No. 395,781. Patented Jan. 8, 1889.

Fig. 1.

Witnesses
Chas. R. Burr.
Thomas Durant.

Inventor
Herman Hollerith
By Church & Church
his Attorneys.

(No Model.)  6 Sheets—Sheet 2.

H. HOLLERITH.
ART OF COMPILING STATISTICS.

No. 395,781. Patented Jan. 8, 1889.

(No Model.) 6 Sheets—Sheet 3.

H. HOLLERITH.
ART OF COMPILING STATISTICS.

No. 395,781. Patented Jan. 8, 1889.

Witnesses.
Chas. R. Burr
A. J. Stewart

Inventor,
Herman Hollerith
By Church & Church
his Attorneys.

(No Model.)

H. HOLLERITH.
ART OF COMPILING STATISTICS.

No. 395,781. Patented Jan. 8, 1889.

Witnesses.
Chas. R. Burr.
A. J. Stewart.

Inventor.
Herman Hollerith
By Church & Church
his Attorneys.

(No Model.) 6 Sheets—Sheet 5.

H. HOLLERITH.
ART OF COMPILING STATISTICS.

No. 395,781. Patented Jan. 8, 1889.

Witnesses.
Chas. R. Burr.
A. F. Stuart.

Inventor.
Herman Hollerith,
by Church & Church
his Attorneys.

(No Model.) 6 Sheets—Sheet 6.

H. HOLLERITH.
ART OF COMPILING STATISTICS.

No. 395,781. Patented Jan. 8, 1889.

Witnesses.
Chas. R. Burr.
A. J. Stewart.

Inventor.
Herman Hollerith
by Church & Church
his Attorneys.

UNITED STATES PATENT OFFICE.

HERMAN HOLLERITH, OF NEW YORK, N. Y.

ART OF COMPILING STATISTICS.

SPECIFICATION forming part of Letters Patent No. 395,781, dated January 8, 1889.

Application filed June 8, 1887. Serial No. 240,629. (No model.)

*To all whom it may concern:*

Be it known that I, HERMAN HOLLERITH, of New York, in the county of New York and State of New York, have invented certain new and useful Improvements in the Art and System of Computing Statistics; and I do hereby declare the following to be a full, clear, and exact description of the same, reference being had to the accompanying drawings, forming a part of this specification, and to the figures and letters of reference marked thereon.

This invention relates to and constitutes an improvement upon or modification of the method, system, and apparatus for compiling statistics forming the subject of a prior application, No. 143,805, filed September 23, 1884, renewed September 8, 1888, Serial No. 284,939, and the division of said application, filed October 27, 1885, and numbered 181,104, renewed September 8, 1888, Serial No. 284,938; and it consists in the several improved forms of mechanism, the addition of a novel sorting device, and the introduction and employment of a new system of separation and classification, whereby both the method and apparatus are simplified, enlarged, and improved, all as hereinafter more fully described and pointed out.

In the accompanying drawings, illustrating the improved apparatus and novel combinations of parts for carrying my invention into practice, Figs. 6 to 12, inclusive, are diagrammatic views illustrating several of the circuit arrangements and combinations which may be employed in carrying out the invention.

Similar letters of reference in the several figures indicate the same parts.

Briefly stated, the method and apparatus as described and shown in my prior applications comprise, first, a strip or web of paper or other material carrying circuit-actuating index-points, the latter representing by their relative location and arrangements the various statistical items pertaining to the individual or thing, the records of a number of individuals being located or arranged successively upon the same strip or web; second, a templet or index for properly locating the several index-points to form the record of each individual; third, a revolving drum and series of circuit-breaking and closing points, the record-strip being passed between said points and drum in a manner to cause the index-points to actuate the circuit-controlling devices; fourth, a series of electric circuits connected to and controlled by the circuit breaking and closing points, and, fifth, a series of mechanical registering devices actuated by electro-magnets included in circuits controlled by the circuit making and breaking points.

The various items or characteristics of each individual or thing having been registered upon the strip or web by index-points arranged according to the predetermined plan marked on the templet, the strip is passed between the circuit breaking and closing points and the drum, so that as each index-point is brought opposite or made to register with its corresponding circuit breaking and closing point it will energize an electro-magnet to actuate a counter or a relay controlling the circuit of a counter. By this means each item or combination of two or more items occurring in the record of the several individuals or things is successively registered on the counting-machines.

I stated in my said prior applications that separate cards or tablets might be employed in lieu of the continuous web or strip and a reciprocating plate or press in place of the drum and contact-points for closing the circuits, and my present invention involves this modification of my prior system and the changes in the form and construction of the apparatus necessary to carry the same into operation, together with other improvements resulting from practical use of the said system and apparatus.

In the first place I have substituted for the continuous web or strip of my prior application a separate strip, card, or tablet, A, upon or within which the index-points are formed, as by punching holes 1 in said card, and instead of using a separate templet or die for locating the several index-points I prefer to stamp or impress upon the cards, as by printing, the places or relative positions in which the index-point for each item is to be located. The card is, for convenience only, divided by lines into spaces, each space being numbered, lettered, or otherwise designated by marks or printed matter to indicate the place where a hole is to be punched in recording the several items pertaining to the individual. In this way each card when properly punched becomes a permanent record of the individual (whose name and number in the books or other matters can, if desired, be written on the face or back of the card) and can be filed away as such, or the several records so formed can be classified and distributed, as hereinafter described. Moreover, the record-card thus formed can be prepared at any time or place and by unskilled operatives, as each record is complete in itself and bears no special relation to any other record except in so far as the relative locations and positions of the corresponding marks are concerned, it being necessary that the corresponding index-points of all the cards should occupy the same relative positions to all the others, which condition is insured by printing all the cards belonging to the series from the same or duplicate plates. The detection and correction of errors can also be more readily accomplished with separate cards than with a continuous strip, especially when the latter is not provided with marks or numbers for indicating the index-points relating to each individual, and the manipulation of the records is greatly facilitated, there being less liability of making a false record by the failure of the index-points to register with the proper circuit-controlling pins or devices.

Figure 13:
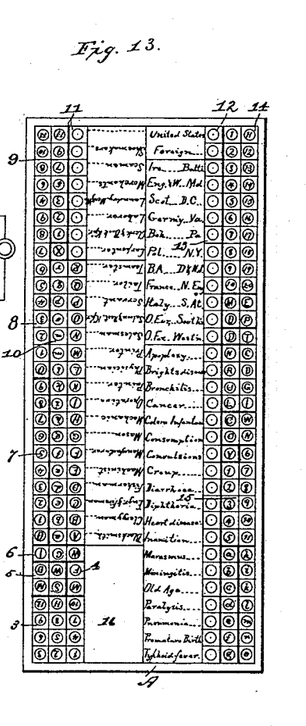
Fig. 13 represents a form of record-card prepared with special reference to the system of registration in use in the health office for the city of Baltimore, Maryland.

For the sole purpose of giving a practical illustration of the working of my improved system I have shown in Fig. 13 a fac-simile of one of a series of cards especially adapted and used in effecting the compilations necessary to the production of mortality and other tables for the city of Baltimore in the year 1886, said cards having been prepared with reference to the several items contained in the reports filed in the health office and embracing time (month) of death, sex, civil condition, race, age, occupation, birth-place, residence, (ward,) and cause of death. The time of death is recorded in one of the spaces 3, marked 1 to 12, to indicate the twelve months of the year; the sex in one of the spaces 4, marked M F, designating male and female; civil condition in space 5, marked S, (single,) M, (married,) W, (widowed,) and D, (divorced;) race in space 6, marked W, (white;) C, (colored;) and I, (including Indians and other races, if desired;) age in one or more of the spaces 7, 8, and 9; the first, 7, numbered 0 to 9, indicating the tens of age; the second, 8, marked 0 to 9, the units of age, and the third, 9, marked 1 to 12, the number of months, used principally for recording those less than one year of age. Occupations are recorded in spaces 10 or 11, arranged opposite the list of occupations, the preferred or most usual being each assigned one of the spaces 11, all others in the list being recorded in two of the spaces 10, the latter arranged in parallel lines and marked with capital and small letters of the alphabet, so that if it is desired to include occupations not on the list the record can be made by punching a hole in each series at certain designated letters. The birth-place is recorded in two series of spaces, 12 and 13, the former designated, respectively, native and foreign, and the latter the several States of the United States and principal foreign countries, so that if the individual was born in this country the record would be made by locating one index-point in the space marked "United States," and another in the space assigned to the particular State, and in the same way if born in a foreign country an index-point would be placed in the space marked "Foreign," and another in the space assigned to the particular country.

The ward in the city of which the individual was a resident is recorded in one of the spaces 14, marked 1 to 20, there being this number of wards in the city of Baltimore.

The "causes of death," being very numerous, are recorded according to a prearranged code in one or more of the spaces 15, a list of the principal causes being printed on the card, each assigned to a single space, while other causes, together with the classes and subclasses, are recorded in one or more of the other spaces properly marked.

A blank space, 16, is left on the face of the card, wherein the number of the certificate or other matter may be written. As this card and the computation based upon the data given are sufficient to afford a clear elucidation of my improved system, I shall restrict the further description of my invention to an explanation of its use in connection with the compilation of statistical items, such as indicated by said card, wishing it to be distinctly understood, however, that my invention is not limited in its use or application to such a system, but may be applied in effecting compilations of any desired series or system of items representing characteristics of persons, subjects, or objects.

The "index-points," so called, by which the various items are recorded upon the cards, must be such as will, when brought into proper position relative to a series of circuit-controlling devices or mechanism connected thereto, serve to actuate the latter, and thus effect or produce electrical changes or variations in the circuits to work the relays or counters, and for various reasons I prefer (but do not limit myself, as other equivalent means may be adopted) to make the cards of paper or similar poor conducting substance, in which the index-points are formed by punching or otherwise removing a portion of the card at the points or spaces assigned to the several items.

The card strip or tablet provided with the index-points arranged according to the predetermined order or system I shall hereinafter designate the "record-card," and by the term "index-points" I mean any device, contrivance, or structure employed for recording the separate items and capable of acting directly or indirectly upon the various circuit-controlling devices.

It is obvious that a record-card of the kind described can be employed to advantage in a system such as described in my prior application, and in connection with apparatus such as shown; but I prefer a machine operating similarly to the one herein shown, wherein the record-card is supported between plates or platens, one or both being made movable and carrying circuit-actuating devices, so that as the plate or plates are reciprocated the circuit-actuating devices appropriated to and registering with the several spaces on the card will be operated through the instrumentality of the index-points present on the card to close or otherwise vary the conditions of the several circuits.

Figure 1:
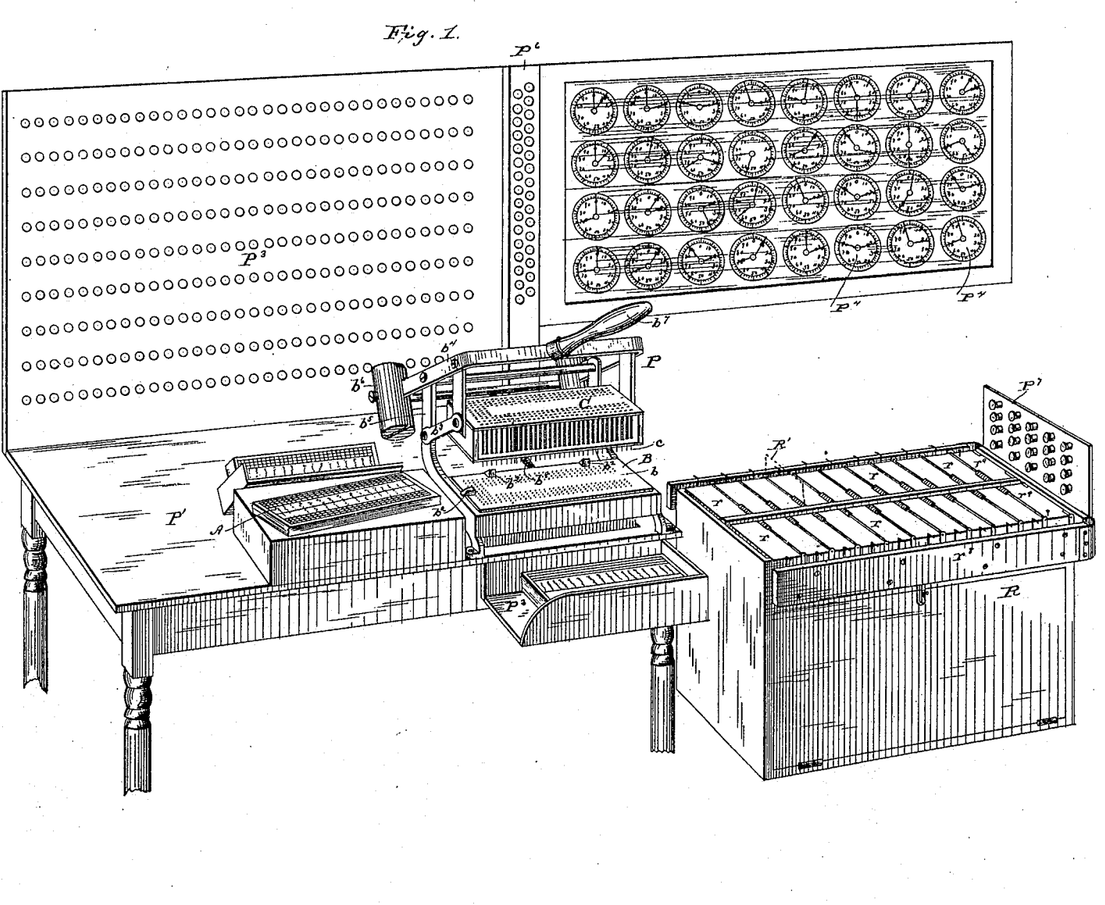
Figure 1 is a view in perspective of a complete compiling outfit or apparatus embodying a press or circuit controlling mechanism, mechanical counters, sorting-boxes, and switch-boards, the circuit-wires being omitted, as they are varied in position according to the system adopted.
Figure 2:
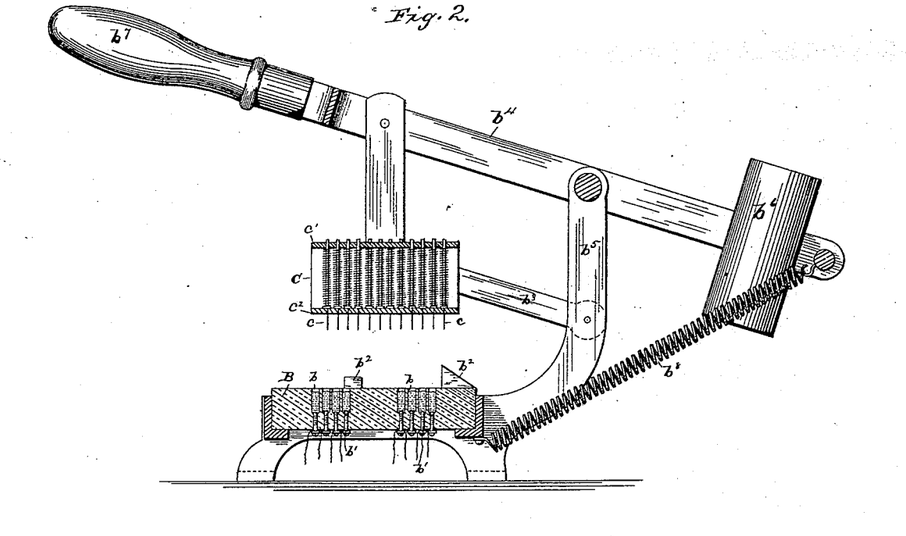
Fig. 2 is a transverse sectional view through the press or circuit controlling apparatus, and Fig. 3 a detail illustrating one of the contact-pins and mercury-cups.
Figures 3, 5, 6, 7:
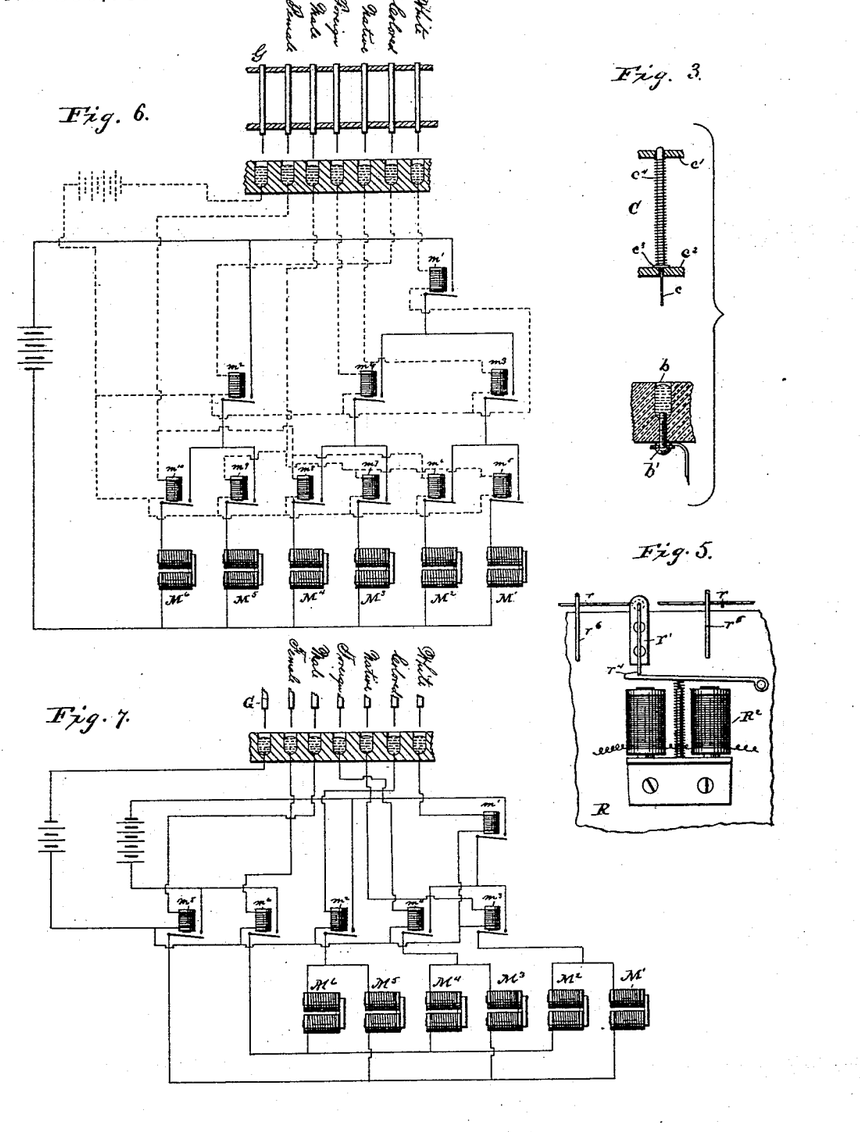

Referring to the example illustrated in the drawings, Figs. 1, 2, and 3, B designates a stationary bed-plate of non-conducting material—such as hard rubber—provided with a series of holes or receptacles, $b$, corresponding in number and location with the spaces marked on the record-card. A wire or the stem of a binding-post, $b'$, projects within each receptacle $b$, and the latter is partially filled with mercury. This bed-plate B in the example given, being stationary, affords a convenient support for the stops or gages $b^2$, of which two (one might do) are preferably located at the rear edge and one at one end, preferably at the left side, said gages serving to position the card when placed upon the plate B, so that the spaces shall stand opposite the corresponding receptacles in the plate.

Above the plate B is arranged a movable platen, C, carrying a series of yielding pins, $c$, corresponding in number and arrangement with the spaces on the card and the holes in the lower plate, B. The platen C being reciprocated toward the plate B, such of the pins $c$ as register with perforations in the card will pass through and into the mercury, while the other pins, striking the unperforated portion of the card, will be retracted; and in order that the movements of the platen C may be properly made, I have mounted it upon parallel links $b^3$ $b^4$, pivotally secured at their opposite extremities to an upright, $b^5$. The lower pair of these links, $b^3$, should, in order to effect as little lateral movement of the platen as possible when approaching the card, be so arranged as to stand parallel, or nearly so, with the face of the plate B when the platen C is at the lower end of its stroke, and the upper pair of links, $b^4$, may constitute a part of a U-shaped bar or frame, the rear end or ends of said bar serving to carry counter-weights $b^6$, while a handle, $b^7$, or other convenient form of operating device is applied to the bar for reciprocating the platen C. In addition to or as a substitute for the counter-weights $b^6$, a spring, $b^8$, may be attached for reciprocating the platen. The two plates $c'$ $c^2$, forming the platen C, are perforated for the reception of the pins $c$, and the latter are each furnished with a collar or shoulder, $c^3$, and a spring, $c^4$, interposed between said shoulder and the upper plate to hold the pins down with their points projecting beyond the face of the platen. According to the arrangement shown, the several pins $c$ are designed to be placed in electrical connection with a ground or to the same pole of a battery, and this can conveniently be done by making the plates of the platen and the frame of the machine of conducting material, and then connecting the frame to the battery or ground, as is well understood.

Figures 14, 15, 16, 17:
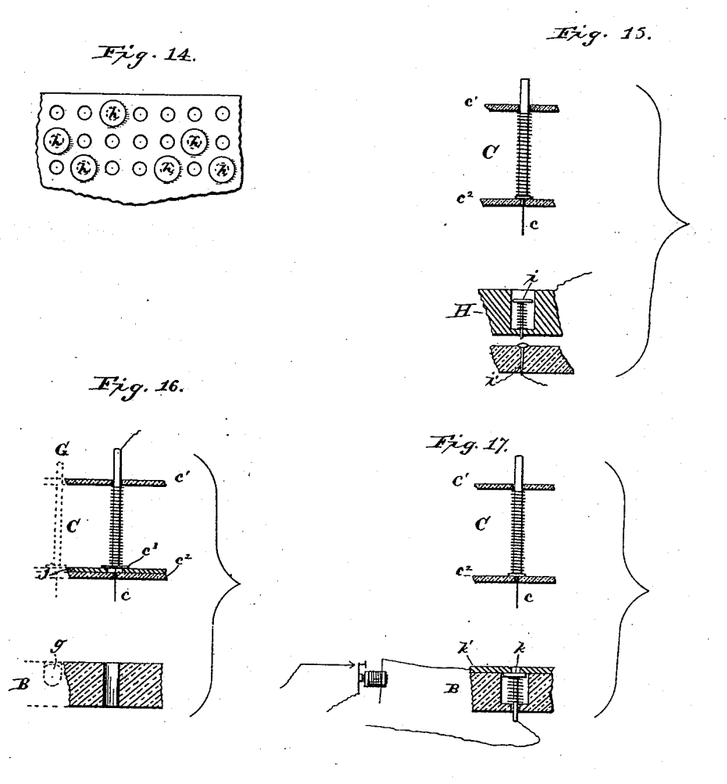
Fig. 14 illustrates a modified plan for applying or arranging the index-points on the card.
Figs. 15, 16, and 17 are detail views illustrating modifications of the circuit-controlling devices.

As will be obvious to those skilled in the art, other and equivalent forms of contacts or circuit-varying devices can readily be substituted for those herein shown without departing from the spirit of my invention; and although I prefer, for various good and sufficient reasons, the arrangement shown, having found the same to be well adapted for carrying my invention into practical use, I do not wish to be understood as restricting myself to said arrangement of circuit-varying devices; nor is it essential that the pins co-operating with the cards should themselves be part of the circuit or operate directly to vary the current, for, as is obvious, the same arrangement of pins can be made to operate through intermediate mechanism to actuate circuit-controlling devices independent of and removed from the plate B—for example, as shown in Fig. 15; nor is it in any way essential that the movement should be confined to the platen C, for if the plate B be reciprocated the same actions would be produced.

Having now described the several improvements in the form of record-card and the apparatus used in connection therewith for effecting the desired electrical changes in the circuits as compared with the corresponding parts of the system shown in my prior appli- cation, I will proceed to explain the improvements appertaining to the method and system.

Where the statistical items are comparatively few and the individual records are prepared with special reference thereto and according to a definite and prearranged plan, a system of computation based upon the continuous-record principle may be used to advantage; but where the individual records embrace a great variety of characteristic and compilations are to be made from time to time covering different periods and embracing a wide range of statistical matter, as in the preparation of health and mortality tables, the continuous record-strip is not well adapted for the purpose, as it does not afford the means for conveniently classifying and reclassifying the individual records.

In order to adapt my prior system and method to the particular class of work indicated, to enlarge the capacity as well as to improve the working of the system, and to adapt it for use in effecting in a more convenient and practical manner the compilations of items of any desired description and covering any given period embraced in the record, I have substituted the separate records for the continuous record-strip and have introduced a system of division and classification of said cards in connection with or as supplemental to the system of compilations and registration shown in my prior applications. According to this part of my invention, the separate record-cards, having been prepared, as hereinbefore described, are divided or separated into two or more general classes, according to the principal items entering into the proposed computations. Thus, as applied to the system illustrated, the whole number of cards (each card representing a complete record of an individual or thing) or the record-cards for any designated period may be divided or separated into groups, according to months, sex, civil condition, race, age, &c. Each group will thus contain all the records pertaining to or embracing a particular statistical item, and by counting the cards the numerical value of that item can be readily ascertained.

Having thus separated the record-cards into general divisions, (and, if desired, subdivided each group on the same plan,) any additional series of statistical items can be compiled either by the further division or subdivision of the record-cards or by passing all the cards or certain groups only through the electrical apparatus. As an example, suppose one hundred record-cards to be used. These are divided according to sex, and it is found there are sixty males and forty females. It now becomes desirable to ascertain their civil condition, and to do this the cards are run through the apparatus, one at a time, first the males and then the females. By observing the registering apparatus of counting the cards if separated into sub-classes it is found that of the first group of cards (males) twenty indicate "married," twenty "single," ten "divorced," and ten "widowed," of the second group, (females,) twenty "married," ten "single," five "divorced," and five "widowed." Thus of the one hundred persons there were married twenty males plus twenty females, equals forty; single, twenty males plus ten females, equals thirty; divorced, ten males plus five females, equals fifteen; widowed, ten males plus five females, equals fifteen. In this way any desired number or character of statistical items can be compiled the same as by the prior system.

As will be readily understood, the number and diversity of statistical items that can be compiled in this way is almost unlimited, as each item or combination of two or more items occuring in the various individual records can be made the basis of a new statistical compilation.

As will be readily understood, it is of the utmost importance in effecting the division and subdivision of the record-cards into groups that the operation should be conducted with the greatest care to avoid misplacing a single card, for if one card is misplaced it may, unless discovered, render incorrect all the computations based upon such division.

In order to facilitate the division of the cards into groups and to insure accuracy in their distribution, I have devised a system whereby each record-card is made to indicate the group or division to which, under the predetermined plan of distribution, it properly belongs.

The divisions or groups into which the cards are to be distributed are determined by some feature characteristic of the individual, and each record-card contains index-points corresponding to all the characteristics of the individual represented thereby; hence the index-points of each card furnish an infallible guide for determining the proper division to which it belongs. If now for each index-point or series of index-points representing one of the designated divisions there is provided a circuit, electro-magnet, and indicator, the latter arranged to point out or designate the group to which each card belongs, and the cards are then passed successively through an apparatus such as hereinbefore described for controlling the circuits by the index-points of the cards, each card will, accordingly as it belongs to one or another of the divisions, actuate the indicator, and thus determine the place or location in which the cards of that group are to be placed.

A convenient form and arrangement of distributing devices suitable for carrying said system into practice is illustrated in the figures.

Figure 4:
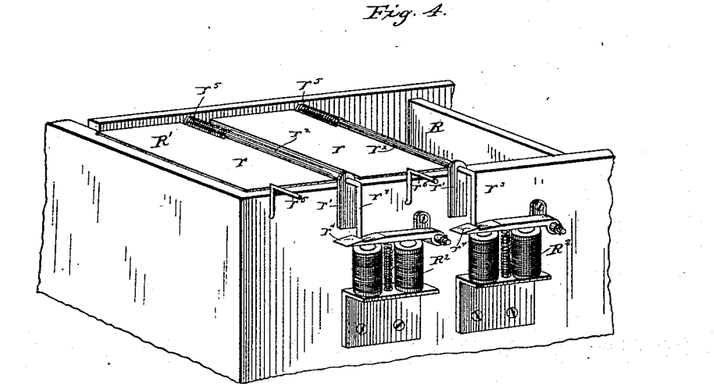
Fig. 4 is a view in perspective, and Fig. 5 a side elevation, of the device for actuating the indicator or lid of the sorting-boxes.

The apparatus which I term the "sorting-box" is composed of two or more boxes or series of boxes, R, arranged, for convenience, side by side in the form of a cabinet, the upper end of each box being open, while one side is made movable to permit access to be had to the interior. Each box is furnished with an indicating device, R', controlled by an electro-magnet, R², the arrangement being such that whenever the electro-magnet is energized the indicator will be displayed. It is obvious that any suitable electric indicator might be employed for this purpose; but, as I prefer to use in connection with the visible indicator a mechanical cut-off or device controlling the entrance or passage leading to the box, I have constructed the indicator in the form of a lid or cover, r, pivotally mounted in supports r' near one side of the open end of the box, so that when the lid r is elevated to indicate the location it will at the same time uncover the receptacle in which the card is to be deposited. The lid r is secured to a rod, r², carrying at one end an arm, r³, whose outer extremity co-operates with a catch, r⁴, to hold the lid down, while a spring, r⁵, is arranged to press constantly in a direction to cause the elevation of the lid. The catch r⁴ of the lid forms or is connected to the armature of an electro-magnet, R².

The operation of the devices as thus arranged is as follows: The lid r, having been closed down upon the mouth of the box, is held in that position and against the pressure of the spring by the catch r⁴ engaging the end of arm, r³. If now the electro-magnet is energized, as when a card bearing index-points corresponding to the division assigned to this box is placed in the circuit-controlling apparatus, it will withdraw the catch from engagement with arm r³, thereby releasing the lid and permitting the latter to be elevated by the spring. A suitable stop, r⁶, is provided for limiting the upward movement of the lid, so that when released it will be held in a vertical position. The lid, being thus elevated, serves not only to indicate the location of the proper receptacle, but at the same time to uncover it. After the card has been deposited the lid is closed preparatory to the next operation. The electro-magnets and catch are mounted upon the side of the cabinet near the upper edge and protected from injury by a strip or covering, r⁸, as in Fig. 1, wherein two series of ten boxes each are shown combined to form a single cabinet, the end boxes, r⁹, not being included as part of the series.

In using this device a box is assigned to each of the divisions or subdivisions into which the cards are to be separated, and the electro-magnet controlling the indicator-lid is connected in a circuit corresponding to and actuated by the index point or points characteristic of that particular division. Each card when placed in position and acted upon by the pins in the movable platen of the circuit-controlling apparatus (if the mechanism hereinbefore described be employed) operates to close a circuit in which is included the electro-magnet R² appropriated to the particular division to which the card belongs. The electro-magnet, being thus energized, attracts its armature and releases the indicator, which latter rises to designate the box into which that card is to be deposited. When one card has been thus disposed of, the indicator is returned and the process is repeated as to the next and each succeeding card. Should any of the cards not belong to either of the designated divisions, the fact would be at once shown by its failure to actuate any one of the indicators and it would be laid aside. As before suggested, it is not necessary to this operation that the indicators should constitute the lids or any part of the boxes proper; but I prefer to construct the indicator in the form of a lid, as shown, for the reason that by so doing all liability of the card being placed in the wrong box is avoided, as only one receptacle is uncovered at any time, and that one is not alone rendered accessible, but its location is designated. When deemed advisable, mechanical counters may be included in the circuits containing electro-magnets r⁷, for indicating the number of cards deposited in the boxes. This system of dividing or separating the cards into groups, while not limited in its application, is more especially designed for use in connection with and as a part of a system for simultaneously registering statistical items, as set forth in my prior applications, and for an illustration of such use reference may be made to Fig. 1, wherein the several mechanical and electrical appliances are shown arranged for operation.

The circuit-controlling apparatus P, or, as I shall designate it hereinafter, the "press," is supported upon a table, P', to the edge of which and in front of the press is attached a receptacle, P², for cards that have been tested in the press and found not to belong to any of the divisions of the sorting-box R, which latter, for convenience, is located to the right of and within easy reach of the operator sitting in front of the press. The circuit-wires leading from the cups in the bed-plate of the press are separately connected to binding-posts on the switch-board P³. The series of counters P⁴ are in like manner connected to binding-posts P⁵, and the electro-magnets of the sorting-boxes are each connected to one of the binding-posts on a board, P⁷.

It is understood, of course, that a battery, or series of batteries and circuit-connections competent to effect the desired action of the several electrical appliances must be provided, and it is equally apparent, that with the information derived from the description hereinbefore given any one skilled in the art would be enabled without invention to supply the necessary connections and complete the circuits, and it is for this reason I have up to the present omitted all mention of specific circuit-connections, as the latter, though necessary, are subordinate and immaterial elements, which can be changed and modified at will without departing from the invention.

It is not practicable within the proper limits of this specification to illustrate the great variety of circuit-connections or systems which may be adopted for carrying my invention into practice, nor do I deem it necessary to do more than illustrate a few of the preferred forms typical of improvements which I have made in this part of the system.

For counting or distributing the cards according to single items or index-points, a series of direct circuits may be used to connect the circuit-controlling devices and electro-magnets of the counting and distributing mechanisms, and the latter may be connected either separately or in series.

For counting or distributing according to combinations of two or more items or index-points, arrangements of circuits similar to those described in my prior application may be employed. I prefer, however, when counting or distributing by two or more index-points to employ relays in some of the circuits controlled by the index-points, said relays operating to control other circuits, which latter are also controlled either by relays similarly arranged or by circuits including the circuit-controlling devices upon which the index-points operate, as by so doing I avoid the necessity for delicate adjustments of resistances incident to some of the circuit arrangements shown in my prior application. For the purpose of illustrating this portion of my invention I have shown in Figs. 6, 7, 8, and 9 a section of the circuit-controlling device (using the press form by way of example only) embracing six pointers or pins and mercury-contacts corresponding to the six selected items representing sex, (male and female,) race, (white and colored,) and nativity, (native and foreign.) A seventh pin (marked G) is also shown, which pin is located in the press at the end of the platen opposite the gage or stop. This pin G is independent of the other series of pins, and is included in circuit with all of them, serving to connect each circuit with its battery or the ground end of the line, so that until said pin G engages the opposite contact in the bed-plate no current will flow through any of the circuits controlled by the other pins. All the pins being grounded through this pin G, and the latter being located as described, it follows that until the card has been properly located the electrical devices cannot be set in action, for if a portion of the card is interposed between this pin and its contact the pin will be held back by the card, thus holding open the circuits. By this means I suspend the action of the circuit-controlling devices when a card is improperly inserted and prevent erroneous counts being made, such as would otherwise inevitably take place should the press be operated before the card was properly located and while its index-points registered with any of the series of points or pins other than those assigned to the specific items. This pin G may also be utilized to prevent sparking at the other contacts by simply increasing the interval between its point and the opposite contact, as by shortening the pin or reducing the level of the mercury in the cup below that in other cups, so that, the card being properly located, the several circuits will be fully closed through the pins before the pin G closes the ground. By this means the oxidation or burning of the electrodes which takes place when the circuit is broken and closed is confined to the pin G and its opposite contact.

In Figs. 6, 7, 8, and 9 I have illustrated four different ways or systems for counting combinations of the following six items, viz: sex, (male and female,) race, (white and colored,) and nativity, (native and foreign,) said items being combined according to six combinations which are selected as typical and very generally followed in statistical work. The six combinations referred to, each of which represents a "statistical item," so called, are, first, native white males; second, native white females; third, foreign white males; fourth, foreign white females; fifth, colored males and, sixth, colored females.

Referring to Fig. 6, the letters $m'$ $m^2$, &c., designate the electro-magnets of ordinary relays, the coils of which are included in circuits, as indicated by dotted lines, with the six cups on one side and with the battery and cup of the pin G on the other. $M'$, $M^2$, $M^3$, $M^4$, $M^5$, and $M^6$ represent a series of magnets, some or all of which belong to the counting mechanism or sorting-boxes, or to both. The coils of each of these magnets are connected in circuit with a battery or batteries on the one side and on the other with a contact controlled by one or more of the series of relay-magnets, the circuits being indicated by full lines. Upon tracing the circuits indicated by dotted lines and full lines, and which I shall, for convenience, term the "primary" and "secondary" circuits, respectively, it will be observed that the primary circuit, including relay $m'$, is controlled by the pointer or pin marked "white," $m^2$ by "colored," $m^3$ by "native," $m^4$ by "foreign," $m^5$ $m^7$ $m^9$ by "male," and $m^6$ $m^8$ $m^{10}$ by "female." The secondary circuit, in which are included the actuating-magnets of the counting or distributing devices, are arranged as follows: $M'$, representing native white males, is in circuit with the contact of relays $m^5$, (male,) $m^3$, (native,) and $m'$, (white.) $M^2$, representing native white females, is in circuit with the contacts $m^6$, (female,) $m^3$, (native,) and $m'$, (white.) $M^3$, representing foreign white males, is in circuit with contacts of $m^7$, (male,) $m^4$, (foreign,) and $m'$, (white.) $M^4$, representing foreign white females, is in circuit with contacts of $m^8$, (female,) $m^4$, (foreign,) and $m'$, (white.) $M^5$, representing colored males, is in circuit with contacts of $m^9$ (male) and $m^2$, (colored,) and $M^6$, representing colored females, is in circuit with contacts of $m^{10}$ (female) and $m^2$, (colored.) It will be observed that each secondary circuit includes the contacts of at least two relays, and that the current from the battery cannot flow through any one of the coils $M'$, &c., until the circuit has been closed through said relays, and as the closing of the relay-contacts is governed by the series of pins cooperating with the index-points on the cards it follows that the secondary circuits can only be closed to operate the counting or distributing devices by the concurrent action of the two or more index-points representing the given item. This system is based upon the use of two independent series of circuits—primary and secondary—one governed by the index-points for controlling the relays and the other governed by the relay-contacts to control the operation of the distributing or counting devices, each of said series of circuits being provided with a separate generator or generators of electricity, so that a battery of low electro-motive force may be employed for the primary circuits, which merely operate the relays, while a stronger battery may be employed in the secondary circuit, where the most work is to be done.

A modification of the system just described is illustrated in Fig. 7, wherein, instead of using three relays each for males and females, only one is used. Relays $m^7 m^9$ (males) and $m^8 m^{10}$ (females) are dispensed with. The circuits of the operating-magnets $M'$ $M^3$ $M^5$, each of the latter representing a statistical item of which the index-point "male" forms one ingredient, are connected to a branch circuit, of which the contact-points of relay $m^5$ (male) form part, while the magnets $M^2$ $M^4$ $M^6$, representing items including the index-point "female," are connected in a branch of which the contact-points of relay $m^6$ (female) form a part. In this case the relays $m'$, $m^2$, $m^3$, and $m^4$ are in circuit with one terminal of the series of magnets $M'$, &c., and the relays $m^5 m^6$ with the other terminal.

Figure 8:
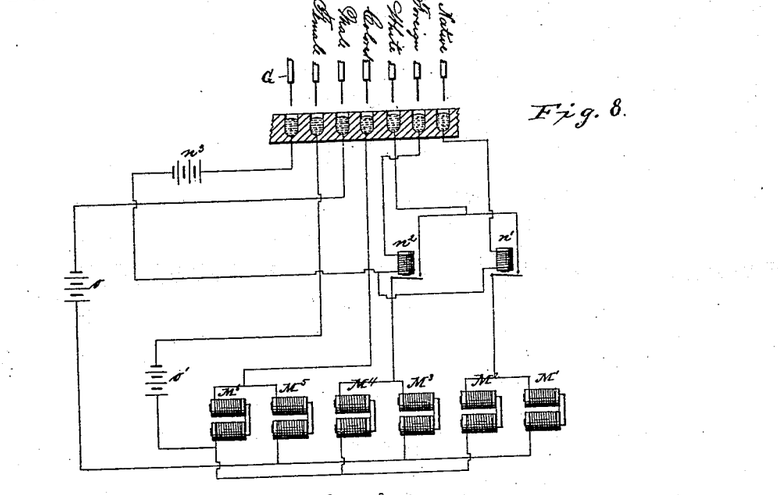

In Fig. 8 is illustrated a system by which the same results may be effected with but two relays and an increased number of batteries.

Figure 9:
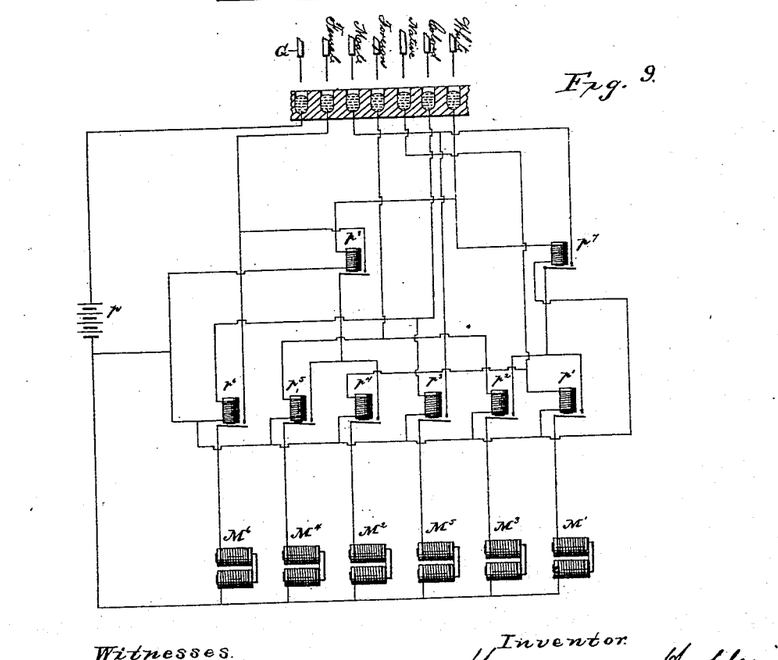

In this example cup of pin "Native" is connected to the relay-magnet $r'$, and the cup of pin "Foreign" to relay-magnet $n^2$, the opposite terminals of both relay-magnets being connected through battery $n^3$ with the cup of pin G, so that when the circuit is closed through pin G and points "Native" or "Foreign," one or the other relay $n' n^2$ will be energized. As the statistical items represented by the operating magnets $M'$, &c., each contains as one element the index-point for representing male or female, a separate battery is employed for each. The battery $o$ is connected on the one side to the cup opposite pin marked "Male," and on the other to each of the magnets $M'$ $M^3$ $M^5$, representing native white, foreign white, and colored males, respectively. The battery $o'$ is connected on the one side to the cup opposite point marked "Female," and on the other to the series of magnets $M^2$ $M^4$ $M^6$. The opposite terminals of magnets $M^5$ $M^6$ (colored males and colored females) are connected to the cup opposite pin marked "Colored," those of the magnets $M^3$ $M^4$ (foreign white males and females) to the contact-points of relay $n^2$, (foreign,) and those of magnets $M'$ $M^2$ (native white males and females) to the contact-points of relay $n'$, (native.) The contact-points of both relays $n' n^2$ are connected to the cup opposite pin marked "White." To illustrate the operation of this system, let us assume that the index points on the record-card represent the three items "Native," "White," and "Male." This card having been placed in position and the platen of the press reciprocated, the pins marked "Native," "White," "Male," and G only will be projected into the mercury-cups, thereby closing the circuits at those points. The current from battery $n^3$ will flow through pins G and "Native" and the relay $n'$ energizing the latter and closing the contact-point. The current from battery $o$ will be conducted through pins "Male" and "White" and the magnet $M'$, thereby operating the counter or distributing device representing the item "Native white male." Should the index-points represent the items "Colored" and "Female" the correspondingly marked points would close the circuit from battery $o'$ through magnet $M^6$, the circuits through all the other operating-magnets remaining open. The same results can be produced by the use of a single battery, as illustrated in Fig. 9.

For convenience of illustration merely the relative arrangement of the operating-magnets $M'$ $M^6$ has been changed, the magnets numbered 1, 3, and 5, representing items having a common index-point, (male,) being associated together in one group, and those numbered 2, 4, and 6 (female) in another. One terminal of all the operating-magnet coils is joined to a common conductor attached to one pole of a battery, $p$, the opposite pole whereof is connected to the pin G. The other terminal of each magnet-coil $M'$ $M^6$ is connected to the contact of one of a series of relays, $p'$ $p^6$, the opposite contacts being connected as follows: $p'$ and $p^2$ to the contact of a relay, $p^7$, whose opposite contact communicates with pin marked "Male," $p^3$ to the pin marked "Male," $p^4$ and $p^5$ to the contact of a relay, $p^8$, whose opposite contact communicates with pin marked "Female," and $p^6$ to the pin marked "Female." It will thus be seen that when the index-point "Male" occurs the circuit will be closed to the contacts of relays $p^7$ and $p^3$. The relay $p^7$ serves merely to establish communication with contacts of relays $p'$ and $p^2$, so that even though relay $p^7$ is operated communication with the battery will not be established, this latter operation being performed by one of the relays $p' p^2 p^3$. In like manner the index-point "Female" closes circuits extending to relays $p^6$ and $p^8$, the latter in turn closing circuit to relays $p^4 p^5$, which, together with $p^6$, control communication with battery through magnets $M^2$, $M^4$, and $M^6$, respectively. It therefore follows that to operate any one of the magnets $M'$ $M^6$ the circuit must be closed at two or more points, according to the number of index-points representing the given statistical item. Thus for combinations of two items—such as "Colored and male" or "Colored and female"—the pin "Colored" would serve to close the circuit at one point and the relay $p^3$ or $p^6$ at another. For combinations of three items—as "Native," "White," and "Male"—the pin "Male" closes circuit at one point, relay $p^i$ (white) at another, and relay $p'$ (native) at a third. If the record shows native, white, and female, relay $p^2$, instead of $p'$, will close. It will be noticed that in this system but two of the pins—those corresponding to male and female—act directly upon the circuits through the operating-magnets $M'$ $M^6$; hence the other index points or pins are employed for effecting the necessary action of the relays. To do this and at the same time make use of the same battery $p$, the following arrangement may be employed: One end of each relay-coil is connected to the battery on the same side as the magnets $M'$ $M^6$, while the opposite ends of the coils of relays $p^7$ and $p^8$ (these relays representing the item "White" forming part of the item represented by magnets $M'$ $M^3$ $M^2$ $M^4$) are connected to the cup of point marked "White," the coils of relays $p^3$ and $p^6$ (representing the item "Colored," common to magnets $M^5$ $M^6$) to cup of point marked "Colored," the coils of relays $p'$ and $p^4$ (representing the item "Native," common to magnets $M'$ and $M^2$) to cup of point marked "Native," and the coils of relays $p^2$ and $p^5$ (representing the item "Foreign," common to magnets $M^3$ $M^4$) to the cup of pin marked "Foreign."

Figure 10:
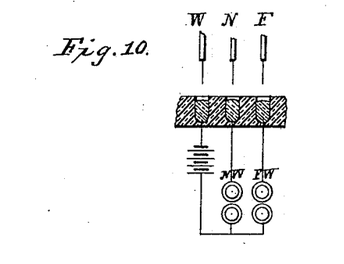
Figure 11:
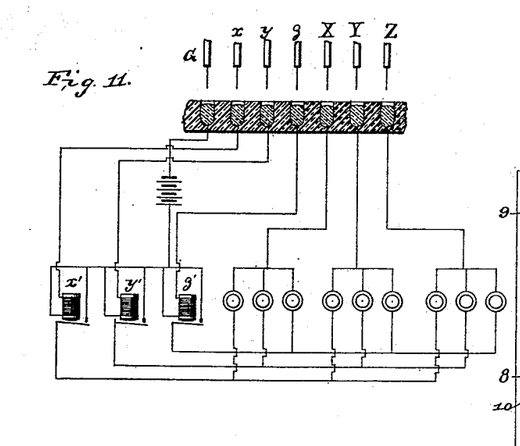

Two modifications of the single-battery system as arranged for counting items represented by two index-points are shown in Figs. 10 and 11.

In my prior application I have shown an arrangement of circuits for counting items represented by two holes wherein but a single battery was employed; but the method therein represented required a very nice adjustment of battery-current, resistance of magnets, and circuits, &c.; hence I prefer the arrangement shown in Fig. 11, wherein X Y Z represent the index-points of one series, and $x$ $y$ $z$ those of another series. The points X Y Z are each connected to three operating-magnets, the opposite terminals of which are connected to the contacts of three relays, $x'$ $y'$ $z'$, and through the latter to the battery, which is in communication with pin G of the platen. Each point $x$ $y$ $z$ is connected to one of the relay-coils $x'$ $y'$ $z'$ and to the battery.

From an inspection of the drawings it will be seen that the points X Y Z determine the group, and the points $x$ $y$ $z$, acting through the relays, the particular magnet in the group. Thus when the circuit is closed at X the first three magnets, X $x$, X $y$, and X $z$, will be connected to one pole of the battery, and as the circuit is made through one of the points $x$, $y$, and $z$ it will operate its relay and connect that one of the three magnets corresponding to the point to the other pole of the battery.

Figure 12:
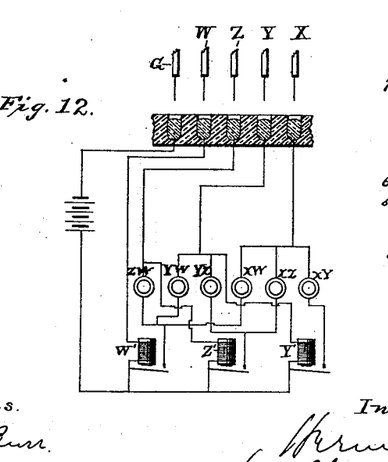

In Fig. 12 is shown another arrangement for effecting combinations of two items. The letters X Y Z W represent four index-points of the card, and G the ground or return circuit. X Y, X Z, X W, Y Z, Y W, and Z W designate the operating-magnets representing the six combined items. One point, X, is connected to the three magnets X Y, X Z, and X W, another, Y, to two of the magnets, Y Z and Y W, and a third, Z, to one magnet, Z W. The fourth point, W, is connected to a relay, W', the third, Z, to a relay, Z', and the second, Y, to a relay, Y'.

Upon inspecting the drawings it will be seen that each operating-magnet will be put in circuit with the battery whenever the circuit is closed through two points representing the individual items of the combination, and that for each combination one point will close the operating-circuit and the other a relay-circuit.

It is proper to remark that when using this system of circuits with a single battery it is necessary to properly proportion and adjust the resistance of the working and relay circuits to prevent the relay-circuits from being short-circuited to such an extent as will permit the separation of the relay-contacts when the working-circuit is closed.

In the preceding description I have, for convenience, illustrated the invention as applied to open-circuit systems and the common forms of relays; but my invention is not restricted thereto, as it can readily be adapted to a closed-circuit system, (see example illustrated in Figs. 16 and 17,) or one in which part of the circuits are normally closed and part open.

The operation of the magnets $M'$ $M^6$ of the systems described may belong to either the counting or sorting apparatus, or partly to each, and if it is desired to sort the cards into groups according to the items mentioned any other items or series of items may at the same time be computed and registered on the counting apparatus, the operating-magnets being connected by the same or a different system, the circuits whereof are controlled by index-points on the cards. Thus the cards can be passed through once and sorted into two or more groups, and each group passed through again and sorted into two or more divisions—as, for example, by passing the cards through and sorting them into "White" and "Colored"—then passing each group through and sorting them into "Native" and "Foreign," giving four piles—"Native white," "Foreign white," "Native colored," and "Foreign colored." Each pile can, if desired, be again subdivided into "Male" and "Female," and while any of the divisions are being made the separate items occuring in each division or the totals of all the divisions may be computed and registered on the counting-machines. In making these divisions of the cards—say into "Native white", "Foreign white," and "Colored"—two sorting-boxes may be connected, as shown in Fig. 10, the magnet N W of one being connected in circuit with pins "Native" and "White," and the other, F W, with pins "Foreign," and "White." If the cards are now run through, the boxes will sort the cards into "Native white" and "Foreign white," "Colored" being left over and placed in receptacle in front of the machine, as no sorting-box would in this case open when card having index-point "Colored" was inserted in the apparatus.

With a view merely of illustrating typical modifications, such as hereinbefore referred to, I have added Figs. 14 to 17, inclusive.

Fig. 14 illustrates a form of record card or strip wherein, instead of punching a hole for each item occuring in the record of an individual or unit, the entire series of items is represented by perforations and the designated items by wafers, strips, or other form of impediment, $h$, which engage and prevent the passage of the points corresponding to the items so designated.

Fig. 15 illustrates the application of circuit-closing contact independent of and separated from the points. In this example the pins $c$ are not included in the circuits, their place being occupied by supplemental contact-point pins $i$, mounted on light springs and connected together electrically as through a metallic bed-plate, H. The pins $i$ are arranged to co-operate each with one of a series of insulated contacts, $i'$. The circuit is closed through the contacts $i$ $i'$ whenever the pin $c$ corresponding thereto enters a perforation in the card or strip and by engaging the pin $i$ presses it down or in contact with $i'$.

Fig. 16 illustrates an arrangement such as is adapted to either an open or a closed circuit system. The pins $c$ are insulated from each other, as by mounting them in plates $c'$ $c^2$, of non-conducting material, and each pin is connected with a circuit-wire. The conducting-collars $c^3$ rest normally in contact with a metallic plate, $j$, also connected in circuit, so that the several circuits are closed through the series of pins and the plate. If the closed-circuit system is to be employed, a card or record-strip of the character indicated in Fig. 14 may be used—that is to say, one in which the items are recorded by means of interceptors. When the pins are brought into contact with the record-strip, those circuits corresponding to the designated items will be broken, as their pins $c$ are forced back and the collars withdrawn from contact with plate $j$, while all the other remaining circuits remain closed. The same device may, when desired, be used in open circuit and in connection with record-cards perforated to represent designated items by the simple addition of a pin, G, co-operating with a contact, $g$, in the lower-plate, B. Said pin, being slightly shorter than pins $c$, will, after the latter have been acted upon by the record card or strip to set the circuits, close the circuit between plate $j$ and the ground or return wire connected to the opposite contact or terminal $g$.

Fig. 17 illustrates another application of the closed-circuit system as adapted for use in connection with the perforated record-strips, the contacts being removed from but actuated by the pins $c$. In this instance the plate B is furnished with a conducting-plate, $k'$, against which contacts $k$ are held in elastic contact by means of springs. Plate $k'$ is connected to the ground or return wire, and each contact $k$ to one of the series of circuit-wires. The record card or strip being interposed between the points $c$ and plates $k'$ and the press operated, those points which register with and pass through the perforations in the record-card will press the corresponding contacts $k$ away from the plate $k'$, thereby opening the circuits including said contacts, while all the other circuits remain closed.

In using a closed-circuit system in connection with the several circuit arrangements shown involving the employment of relays, it is necessary that the contacts of the relays should be reversed, as indicated in Fig. 17—that is to say, where in the open circuit the contact of the relay is closed by the passage of a current through the coil of the relay and held open by a spring or gravity in the closed system it would be held open by the passage of the current through the coil of the relay and closed by the spring or weight when the circuit through the coil of the relay was broken, as is well understood.

Having thus described my invention, what I claim as new is—

1. The improvement in the art of compiling statistics, which consists in first preparing a series of separate record-cards, each card representing an individual or subject; second, applying to each card at predetermined intervals circuit-controlling index-points arranged, according to a fixed plan of distribution, to represent each item or characteristic of the individual or subject, and, third, applying said separate record-cards successively to circuit-controlling devices acted upon by the index-points to designate each statistical item represented by one or more of said index-points, substantially as described.

2. As an improvement in the art of compiling statistical matters by the aid of mechanical or electrical appliances, the hereinbefore-described method of preparing and manipulating the circuit-controlling record, which consists in forming a separate record-card for each individual or thing by applying to said card at predetermined places index-points representing all the characteristic items pertaining to that individual or thing and subsequently subdividing the series of separate record-cards into groups and submitting the cards in each group or division to the action of the circuit-controlling devices, substantially as and for the purpose set forth.

3. The improvement in the art of compiling statistical matters, consisting in first forming a separate record-card for each individual or thing by applying to said card a series of index-points, each bearing a fixed relation to all, the others and to a standard, separating the record-cards into different groups or series, and finally applying the record-cards of the series successively to a series of circuit-controlling devices corresponding in relative position to the predetermined series of index-points representing the several items forming part of the statistical matters to be computed, substantially as described.

4. The hereinbefore-described improvement in the art of compiling statistics, &c., which consists in first forming a permanent record of each individual or thing by applying a series of circuit-controlling index-points upon a separate card or tablet, each point occupying a fixed relation to all the others and to a standard, and subsequently separating the series of record-cards into groups or divisions and by means of electrical appliances co-operating with the index-points counting the series of statistical items represented by any given point or series of two or more points, substantially as described.

5. The improvement in the art of compiling statistical matters, as hereinbefore described, consisting in first locating a series of separate points or spaces upon a series of cards, each point or space having a fixed relation to all the others; secondly, apportioning the spaces or points among the several items entering into the computation and giving to each item one or more of the spaces or points as its representative; thirdly, forming upon each card the complete record of one individual or subject by applying in the representative space or spaces a circuit-controlling index point or points for each one of the series of items which relate to the particular individual or subject, and, finally, applying all the records thus formed separately and successively to the circuit-controlling apparatus operated by the index-points to designate any one or more of the items represented thereby, substantially as described.

6. As an improvement in the art of compiling statistics, the hereinbefore-described method for facilitating the classification of individual records and simplifying the process of computation, which consists in first assigning to each item entering into the proposed series of computations one or more designated points or spaces; secondly, forming a complete record of each individual or subject upon a single card by applying a circuit-controlling index point or points to each space appropriated to or indicative of each separate item in the given series which pertains to the individual or subject, and, finally, feeding said cards successively to an apparatus operated by the index-points on each card to designate the particular division to which it belongs, and depositing each card in a place or receptacle corresponding to the division thus indicated, substantially as described.

7. The hereinbefore-described improved system for compiling statistical matters, consisting, essentially, in the combination, with a series of circuits and operating electro-magnets and a series of pins controlling said circuits, of a series of separate record-cards, each card bearing circuit-controlling index-points indicative of items characteristic of an individual or subject.

8. The combination, to form a system for compiling statistical matters, as hereinbefore described, of a series of separate cards, each card bearing a series of index-points representing the items or characteristics of one individual or subject, an apparatus provided with a series of circuit-controlling devices corresponding and co-operating with the index-points on the cards, a system of electro-magnets connected to said circuit-controlling devices, and a series of operating electro-magnets forming part of said system, substantially as described.

9. In a system such as described, the combination, with the separate record-cards bearing index-points representing items or characteristics of the individual or unit, as described, of a series of pins co-operating with said index-points, a series of circuits controlled by the pins and index-points, and operating-magnets controlled by said circuits, substantially as described.

10. The combination, to form a system such as hereinbefore described, of a series of separate record-cards, each representing an individual or unit provided with circuit-controlling index-points, an indicator controlled by an electro-magnet, a circuit-controlling device co-operating with the index-points on the card, and circuit-connections, such as indicated, connecting the electro-magnet of the indicator with said circuit-controlling devices, substantially as described.

11. The combination, in a system such as described, and with a circuit-controlling apparatus, a system of circuits connected thereto, and a series of record-cards having index-points, of a series of sorting-boxes and indicators therefor, included in the system of circuits controlled by the index-points on the cards, substantially as described.

12. The combination, to form a system such as described, of a circuit-controlling apparatus, a system of circuits connected thereto, a series of record-cards provided with index-points co-operating with said circuit-controlling apparatus, a series of electro-magnets included in said system of circuits, indicators controlled by said electro-magnets, and a series of sorting-boxes corresponding with the indicators, substantially as described.

13. In a system such as described, the combination, with a record card or strip, circuit-controlling devices, and a system of circuits connected thereto, of operating-magnets controlled by said circuits, and a series of boxes provided with lids controlled by said operating-magnets, substantially as described 14. In a system such as described, the combination, with separate record-cards, of circuit-controlling devices co-operating with index points on the cards, a system of circuits, one or more boxes or receptacles for cards, a movable lid or section controlling the entrance to each box or receptacle, and actuating devices for the movable lid or section, said devices being controlled by the index-points on the record-cards to designate the proper receptacle for each card, substantially as described.

15. The combination, to form a system such as described, of a series of record-cards having index-points, circuit-controlling devices operated by said index-points, a series of circuits connected to said circuit-controlling devices and including operating electro-magnets, a series of boxes or receptacles corresponding to the group into which the cards are to be divided, and indicating and directing devices actuated by said operating-magnets, substantially as described.

16. In a system such as described, and in combination with a record card or strip provided with index-points representing items, a circuit-controlling apparatus provided with a separate contact for each index-point of the series, and a series of operating electro-magnets for actuating independent counting and indicating devices, a system of circuits intermediate the circuit-controlling devices and operating-magnets, said system embracing a series of relay-circuits controlled by one or more of the contacts in the circuit-controlling apparatus, and a series of direct circuits, including the contacts of the relays and governed by one or more contacts of the circuit-controlling apparatus, substantially as described.

17. The combination, to form a system such as described, of the record-cards bearing index-points, a circuit-controlling contact for each index-point in the series, operating-magnets, and a system of circuits, substantially such as described, embracing a series of circuits including the coils of relays and certain designated circuit-controlling contacts, and another series of circuits embracing one or more designated circuit-controlling contacts and the contacts of one or more relays, said operating-magnet being controlled by at least two pairs of contacts, substantially as described.

18. In a system such as described, the combination, with the perforated record-cards and a system of circuits controlled thereby, of a bed-plate and platen between which the cards are successively fed, a series of yielding pins mounted upon the platen, and a corresponding series of mercury-cups in the bed-plate, substantially as described.

19. In a system such as described, the combination, with the record-cards provided with the series of index-points, a bed-plate provided with a series of contacts forming the terminals of a system of circuits, such as described, and a reciprocating platen carrying a series of contact points or pins corresponding in number and arrangement with the index-points on the cards, of a gage or gages for locating the cards, and a pin connected to the ground or return circuit and located at or near the edge of the card to prevent the closing of the circuits until the card has been properly placed, substantially as described.

20. In a system such as described, the combination, with the record-cards, the electrically-controlled series of contact-points carried by the platen, and the insulated series of contacts in the bed-plate, of a series of conductors each connected at one end to a contact in the bed-plate corresponding in position to one of the index-points and at the other end to a contact common to all of said circuits, said common contact or ground co-operating with a contact-point in the platen, and thus closing any or all of the circuits, substantially as described.

21. In a system for compiling statistical matters, as hereinbefore described, the combination of a series of record-cards bearing circuit-controlling index-points, a circuit-controlling apparatus for co-operating with said cards, a switch-board to which the circuit-wires of said apparatus are connected, a series of mechanical counters and operating-magnets therefor, and a series of sorting-boxes provided with indicators and operating-magnets therefor, and a system of circuits and connections, substantially as herein described, for connecting the several devices for effecting the operation of counting and sorting, or both counting and sorting, the cards, as well as the items recorded thereon by index-points, substantially as and for the purpose set forth.

HERMAN HOLLERITH.

Witnesses:
JOHN R. FLOYD,
EDWARD N. HILL.